(No Model.) G. W. McCASLIN. 4 Sheets—Sheet 1.
CONVEYER.
No. 409,612. Patented Aug. 20, 1889.
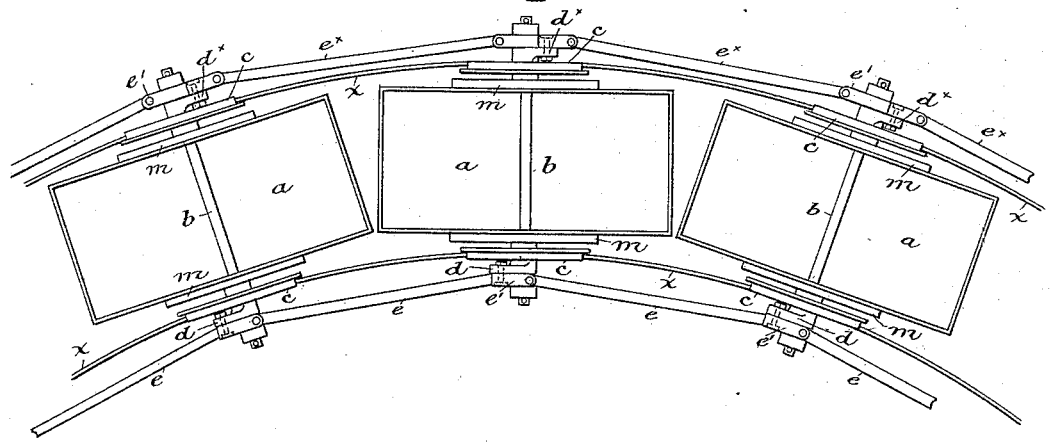
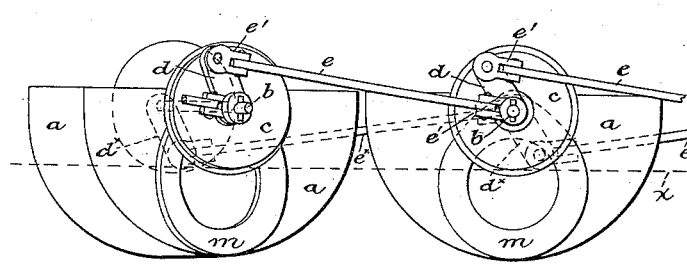
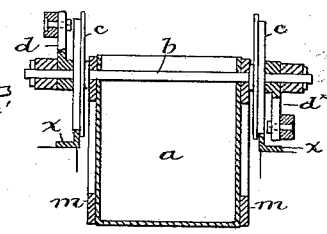
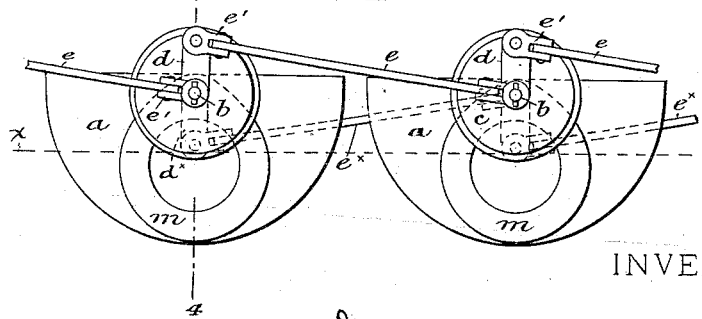
WITNESSES:
E. B. Bolton
J. H. Caplinger
INVENTOR:
George H. McCaslin
By Henry Connett
Attorney.

(No Model.) 4 Sheets—Sheet 2.

G. W. McCASLIN.
CONVEYER.

No. 409,612. Patented Aug. 20, 1889.

Nº 1.    Nº 2.

WITNESSES:
E. B. Bolton
J. D. Daplinger

INVENTOR:
George W. McCaslin
By Henry Connett
Attorney.

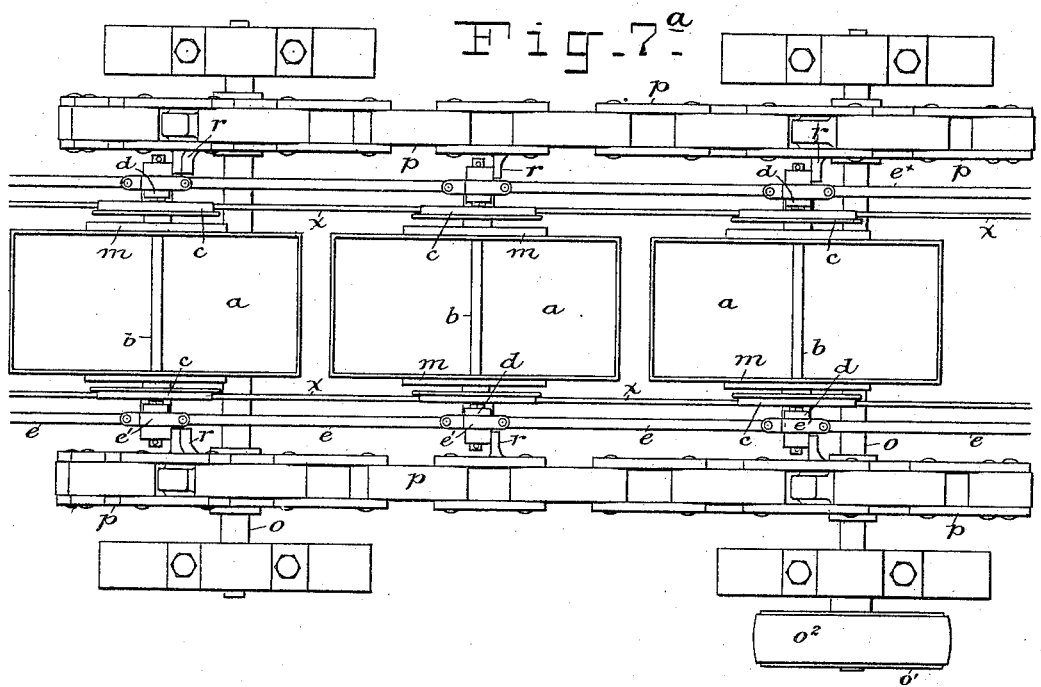

(No Model.) 4 Sheets—Sheet 4.
G. W. McCASLIN.
CONVEYER.
No. 409,612. Patented Aug. 20, 1889.
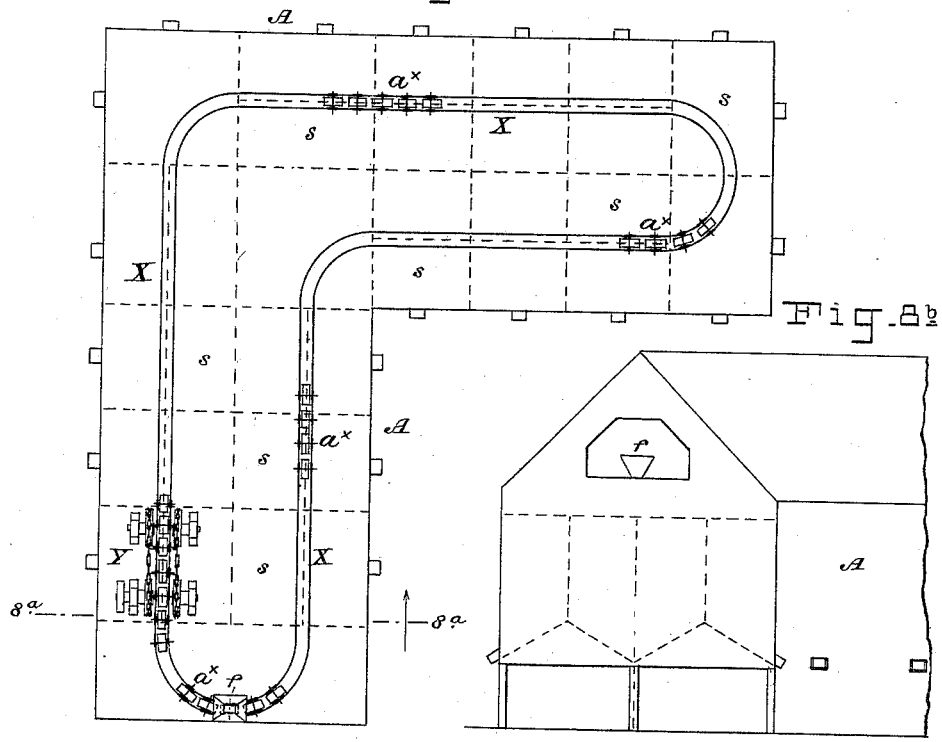
Fig. 8.
Fig. 8<sup>b</sup>.
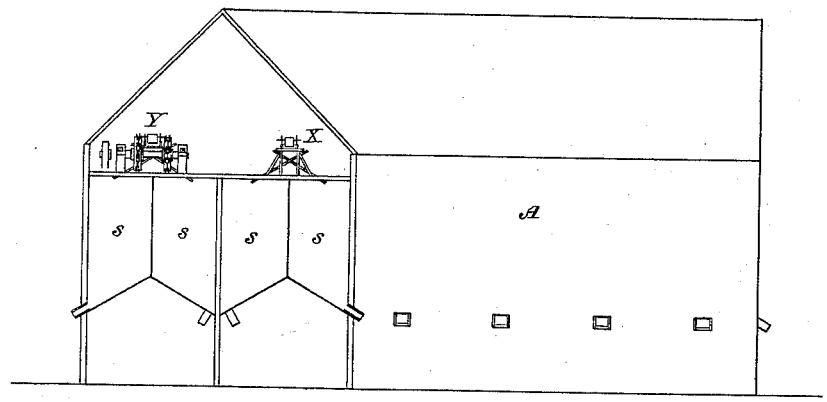
Fig. 8<sup>a</sup>.
WITNESSES:
INVENTOR:
George W. McCaslin
By Henry Connett
Attorney.

UNITED STATES PATENT OFFICE.

GEORGE W. McCASLIN, OF NEW YORK, ASSIGNOR TO THE McCASLIN MACHINE COMPANY, OF WEST NEW BRIGHTON, NEW YORK.

CONVEYER.

SPECIFICATION forming part of Letters Patent No. 409,612, dated August 20, 1889.

Application filed July 27, 1888. Renewed July 26, 1889. Serial No. 318,727. (No model.)

*To all whom it may concern:*

Be it known that I, GEORGE W. MCCASLIN, a citizen of the United States, residing in the city, county, and State of New York, have invented certain Improvements in Conveyers, of which the following is a specification.

My invention relates to the class of endless conveyers adapted for receiving, conveying, and delivering coal, grain, and the like. A conveyer of this type or class is illustrated and described in my Letters Patent No. 387,241, dated August 7, 1888, and I will refer herein to my said patent for a clearer understanding of some features of the conveyer not fully illustrated in this application, for the reason that they are not herein claimed.

The object of the present invention is, in part, to provide the buckets of the conveyer with couplings which will keep them rigidly distanced and yet allow the chain of connected buckets to be carried about curves, both lateral and vertical, and to be drawn along vertical, horizontal, spiral, or inclined tracks.

It also has for its object to provide the conveyer with a cut-off, actuated and controlled by some part of the conveyer, to prevent the material descending from the hopper or magazine at the receiving or loading point from falling between the buckets.

It also has for its object to provide a driver of novel construction for the endless conveyer.

My invention will be fully described hereinafter, and its novel features carefully defined in the claims.

Figure 5:
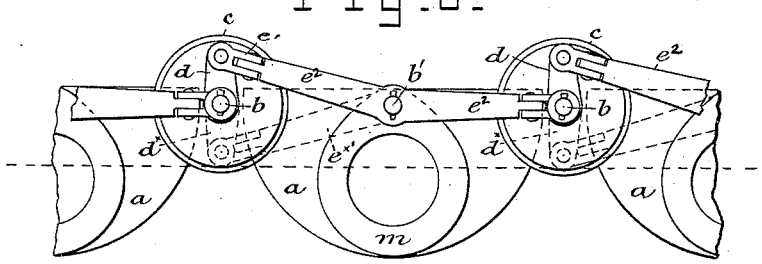
Figure 6:
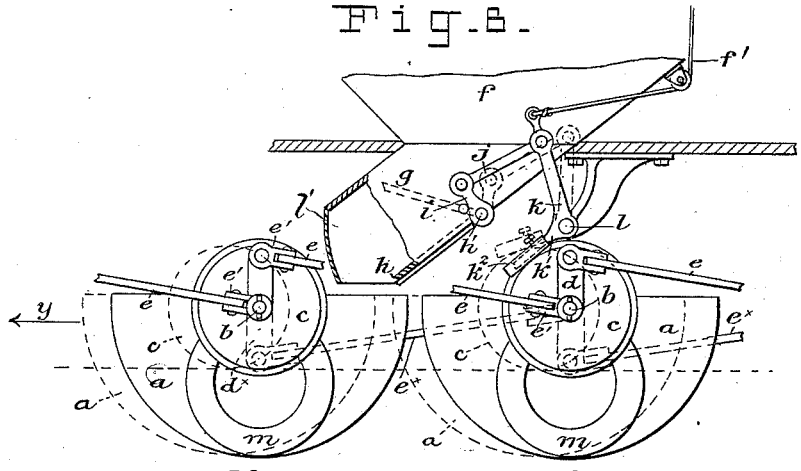
Figure 7:
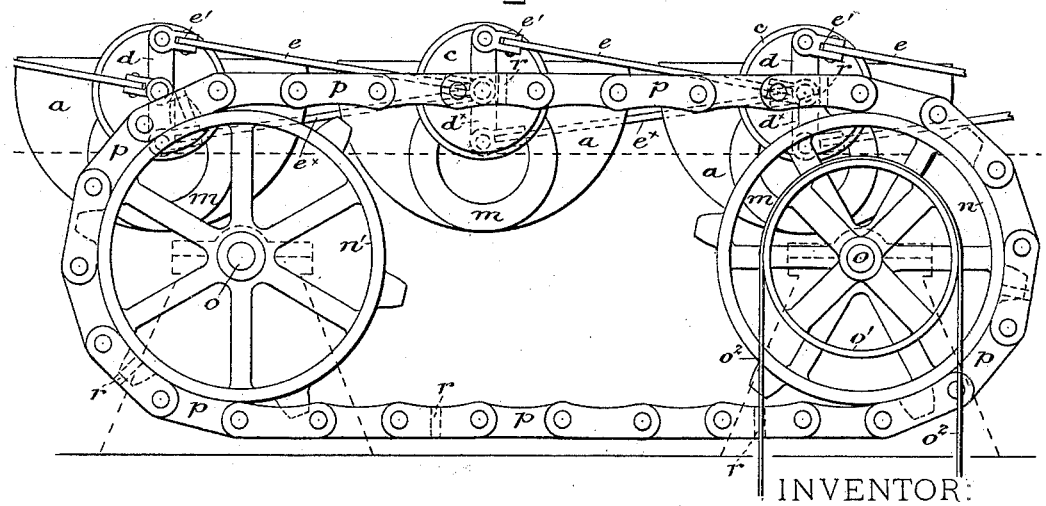

In the accompanying drawings, which serve to illustrate my invention, Figure 1 is a plan view of a portion of an endless conveyer mounted on a laterally-curved track, the buckets of which conveyer are provided with my self adjusting and compensating couplings. Fig. 2 is a side elevation of two of the buckets seen in Fig. 1, showing the compensating coupling as it appears when the conveyer is turning a curve. Fig. 3 is a view similar to Fig. 2, but showing the positions of the parts when the conveyer is moving on a straight track. Fig. 4 is a transverse vertical section of the conveyer in the plane indicated by line 4 4 in Fig. 3. Fig. 5 is a view similar to Fig. 3, illustrating a different arrangement of the buckets in the coupling-links. Fig. 6 is a side elevation, partly in section, of the cut-off for regulating the flow of the material from the hopper or magazine at the point where the conveyer receives its load. Fig. 7 is a side elevation of the driver for the conveyer, and Fig. $7^a$ is a plan of same. Figs. 8, $8^a$, and $8^b$ are views, on a small scale, designed to illustrate, somewhat diagrammatically, a plant provided with my conveyer. These views illustrate the application of the conveyer under circumstances where the track over which the conveyer travels is horizontal and has several lateral curves. Fig. 8 is a sectional plan. Fig. $8^a$ is a sectional elevation on line $8^a$ $8^a$ in Fig. 8; and Fig. $8^b$ is a front view of the building, showing the receiving-hopper.

The mode of mounting and coupling the buckets forming the endless conveyer will first be described with reference to Figs. 1, 2, 3, and 4.

$x$ $x$ represent suitable track-rails laid to form a track or way for the conveyer. In Fig. 1 this track is represented as curved.

$a$ $a$ are the buckets of the conveyer, here represented as semi-cylindrical gravity-buckets, similar to those described in my before-mentioned patent. Each bucket is hung on a cross-shaft $b$, on the ends of which are loosely mounted the flanged track-wheels $c$ $c$, which support the bucket and roll on the track-rails. The bucket $a$, shaft $b$, and wheels $c$ $c$ form a conveyer element, and these elements are arranged in an endless series. The buckets $a$ are coupled together by means of self adjusting and compensating couplings, so that the conveyer may be carried over straight, horizontal, or vertical tracks, inclined tracks, laterally-curved tracks, or laterally-oblique tracks or courses, and yet there will be no slack in the couplings on the short side and no undue distention on the opposite side. For example, when the conveyer-buckets are passing around a lateral curve, as represented in Fig. 1, the coupling will be rigid at both sides of the bucket and the buckets will be rigidly distanced.

By the term "compensating," as herein employed to characterize my improved coupling, I mean a coupling which, when the conveyer elements are moved about a lateral curve, will proportionately expand and contract at the outer and inner sides of the curve, one side of the coupling being dependently connected with the other side, as will be described.

This coupling is constructed in the manner I will now describe. $d\ d^x$ are oppositely-arranged cranks rigidly fixed on the shaft or axle $b$ at opposite sides of the bucket $a$. When the conveyer is on a straight track, as seen in Fig. 3, the crank $d$ stands upright, perpendicular to the track, and the other crank $d^x$ projects in the opposite direction or downward. Both cranks are of the same length and have the same throw. A coupling-link $e$ is coupled to the wrist-pin of crank $d$ at one end and to the shaft $b$ of the adjacent bucket at the other end. A similar or like link $e^x$ couples the crank $d^x$ to the other end of the same shaft $b$. This form of coupling extends throughout the whole series of buckets forming the endless conveyer. When the shafts $b$ of the buckets stand parallel with each other, as they will when the track is straight, the cranks will stand as in Fig. 3 and will form like angles with their respective obliquely-arranged coupling-links; but when the conveyer is on a curve, as in Fig. 1, and the several shafts $b$ coincide with the radii of the curve the compensating couplings will allow the buckets to close together on the inside of the curve and to move apart on the outside. Fig. 2 illustrates how this is done. The inside crank $d$ swings over, lessening the angle between it and its link $e$, and the shafts of the adjacent buckets are drawn together on that side. The crank $d^x$ at the same time swings over in the opposite direction, and thus increases the angle between it and its link $e^x$, and the adjacent shafts $b$ are moved farther apart at their outer ends. This compensating movement of the cranks will cause the shafts of the buckets to assume their proper radial positions with respect to the curve in the track. If the track were curved in the opposite direction to that seen in Fig. 1, the result would be the same, except that the cranks would swing in the opposite direction.

In order to allow for the slight lateral play at the coupled ends of the link, due to the radial positions taken by the shafts when the conveyer is on a curve, I provide the link with joints at $e'$, or with some like device that will permit of lateral flexure.

The cranks may be of any length. I have represented them rather longer than necessary in the drawings, in order to better illustrate their operation. As long as the conveyer is moving on a straight track the cranks, under the conditions described, will stand perpendicular to the track, whether the latter is horizontal, vertical, or inclined; but if the track curves laterally the cranks will swing out of the perpendicular. In the construction just described the bucket is hung on the same shaft or axle as the wheels $c$, and this construction is preferable, as it throws the weight of the load directly on the wheels; but the bucket may be suspended between the shafts $b$ on lugs or pivots in the links $e'\ e^{x\prime}$. This construction is illustrated in Fig. 5, where the bucket is pivoted on the lugs $b'$. The links $e^2\ e^{x\prime}$ in Fig. 5 perform the same functions as and are substantially the same as the links $e$ $e^x$ in Figs. 2 and 3. The buckets $a$ are filled from a suitable hopper or magazine arranged at a convenient point over the track. In Fig. 6, $f$ represents a part of such a hopper, and $g$ the chute, through which the coal or other material passes down into the buckets of the conveyer.

In order to prevent the material from falling down into the space between the buckets as they pass along, I provide a cut-off, actuated and controlled by the conveyer, to check the flow of the material during the brief interval that the gap or space between the buckets is under the chute $g$. This device is clearly illustrated in Fig. 6, in which view the arrow $y$ indicates the direction in which the conveyer is supposed to be moving. In the bottom of chute $g$ is a valve $h$, hinged at $h'$, and adapted to be turned upward at its free end, so as to close or partly close the mouth of the chute. When down, as represented in full lines in Fig. 6, this valve forms a part of the bottom of the chute.

The hinge-axis $h'$ is a shaft mounted to rock in suitable bearings on the chute, and on its outer end is secured an arm $i$. This arm is coupled by a link $j$ to one arm of a bell-crank or elbow lever $k$, pivotally mounted at $l$. The pendent or downwardly-directed arm $k'$ of the bell-crank stands in the path of some part of the moving conveyer, which acts as a pusher or lifter to raise said arm and through the link $j$ and arm $i$ to throw up the valve $h$ and check the flow of the material from chute $g$. I prefer to utilize the wheel $c$ to actuate the valve $h$, and have shown this arrangement in Fig. 6.

The full lines represent the leading bucket (No. 1) as having received its load and the wheel $c$ on the succeeding bucket (No. 2) as in contact with the arm $k'$ of the elbow-lever and ready to act upon it. The dotted lines show the positions of the parts when the conveyer has moved ahead and the valve has risen high enough to check the flow from the chute. By the time the wheel of the conveyer shall have advanced far enough to permit the arm $k'$ to fall, and with it the valve $h$, the next bucket will have been brought far enough under the chute to receive its charge. To prevent the material from being shot out so far as to pass over the advancing end of the bucket when the valve is first opened, the chute may have a screen or shield $l'$ at its end. Only one arm $i$, link $j$, and elbow-lever $k$ are shown in the drawings; but to avoid side draft and render the operation of closing the valve less exacting on the moving conveyer these parts may be duplicated and the wheels on both ends of the bucket-shafts be each made to perform its share of the work.

In order to allow the operating-arm $k'$ of the elbow-lever to be lengthened or shortened conveniently to suit different spacings of the elements of the conveyer, I prefer to provide said arm with an extension-piece $k^2$, as shown; but this is not essential to the invention, as the arm may be made of the proper length once for all.

It will be seen that the above-described device measures the charge delivered to the conveyer-bucket, and its parts can be so proportioned that each bucket will receive only a predetermined quantity. The valve $h$ may be closed by means of a rope or chain $f'$, attached to the end of the bell-crank $k$ and extending up to some point above, where it can be controlled by an attendant. The buckets are or may be provided with dumping-cams $m$ $m$ on their ends, like or similar to those illustrated and described in my before-mentioned patent, and cams to act on those borne by the buckets may be placed at proper points along the track to effect the dumping of the buckets, as illustrated in my said patent.

Figs. 7 and 7ª illustrate a driver for the endless conveyer. This comprises two pairs of sprocket-wheels $n$ $n'$, each pair fixed on a cross-shaft $o$, and two like endless chains $p$, mounted on said sprocket-wheels—that is, there is a chain $p$ on the wheels $n$ $n'$ at one side of the track and a like chain on the like wheels on the opposite side of the track. The chains $p$ run in planes close to the ends of the bucket-shafts $b$, and one side of said chains, preferably the upper side, is on a level with said shafts. On the face of the chain, at proper intervals, are fixed laterally-projecting pushers $r$ $r$, which, as the chain moves along, catch against the ends of the shafts $b$ or the bosses of the parts journaled thereon and carry or push the conveyer along. I prefer to use chains $p$ of such length that two of the pushers $r$ at each side will be in action at the same time. The chain $p$ may be driven by a pulley $o'$ and belt $o^2$, and said pulley may be on either shaft $o$. I make no claim to this particular kind of driver for the conveyer; nor do I limit myself to the use of it or any other form of driver.

Figs. 8, 8ª, and 8ᵇ illustrate one application of my conveyer. A represents any suitable building or structure furnished with pockets or reservoirs $s$ for the material—as coal, for example. On the upper floor of this structure, above the pockets, is an endless track X for the conveyer, this track having any desired number of lateral curves. The endless conveyer will entirely fill the tracks, although I have not deemed it necessary to show the whole conveyer on Fig. 8, parts only being shown at $a^\times$ $a^\times$ in this figure. The hopper $f$, from which the buckets are filled, is placed at the front of the building, where it may receive coal from boats or barges in a well-known way. The driver (seen in detail in Figs. 7 and 7ª) may be situated at the point Y in Figs. 8 and 8ª. The dumping-cams, which may be the same as those described in my before-mentioned patent, will be arranged along the track at the points where the chutes are situated that lead into the several pockets $s$. This dumping apparatus forms no part of my present invention.

With respect to my new compensating coupling, I wish to have it understood that while I prefer that the cranks $d$ $d^\times$ shall be of the same length and arranged exactly opposite, and that they shall stand normally perpendicular with the track, as in Fig. 3, the links $e$ $e^\times$ being also equal in length, I do not limit myself to exactly this proportion and arrangement of these parts.

Any one familiar with the principles governing the operation of the coupling will readily understand that the same results, or a sufficiently close approximation thereto, may be obtained without strictly adhering to the proportions and arrangements given.

Having thus described my invention, I claim—

1. A conveyer comprising a series of buckets mounted on track-wheels and connected together by rigid-link compensating couplings—that is, couplings which expand at the outside of the curve when the conveyer is moving about a lateral curve and contract proportionately at the inside of the curve—as set forth.

2. A conveyer comprising buckets mounted on track-wheels and connected together in endless series by compensating couplings, said couplings comprising substantially oppositely-arranged cranks on the wheel-shaft, and links coupled to the respective cranks at one end and to the adjacent axle at their other ends, substantially as set forth.

3. A conveyer comprising gravity-buckets, as $a$ $a$, arranged in endless series, the shafts $b$ $b$, on which said buckets are hung, the wheels $c$ $c$ on said shafts, the cranks $d$ and $d^\times$ on the opposite ends of said shafts, the link $e$, coupled at one end to crank $d$ and at the other end to the adjacent axle, and the link $e^\times$, coupled at one end to crank $d^\times$ and at the other end to the axle next adjacent, whereby, when the conveyer is moved around a curve in the track, the shafts or axles will assume their proper radial positions, as set forth.

4. The combination, with an elevated magazine having an outlet at its lower part for discharging its contents and a positively-closing cut-off controlling said outlet, of a conveyer consisting of an endless series of conveyer elements moving under said cut-off continuously in one direction, a part of said cut-off being in the path of a part of each conveyer element, and said cut-off being closed thereby as each element passes, whereby the material from the magazine is prevented from falling between the conveyer elements.

5. The combination, with a conveyer consisting of an endless series of conveyer elements, each consisting of a bucket, its supporting-wheels, and wheel-shaft, of a magazine arranged above said conveyer, a chute for the material, a cut-off to check the flow from said chute, and an operating-arm connected with said cut-off and arranged in the path of some part of the conveyer elements and adapted to be actuated by each element in succession, whereby the flow from the chute is checked intermittently and the charge measured, as set forth.

6. A conveyer comprising a series of buckets mounted on track-wheels and connected together by couplings formed of rigid links arranged in pairs at the sides of the buckets and connected dependently by a cross-shaft, and cranks, whereby, when the conveyer moves about a lateral curve, the contraction at one side is compensated by expansion on the other side, as set forth.

7. The combination, with the conveyer comprising an endless series of coupled elements, as described, of the hopper or magazine and its chute, the valve $h$, hinged in the chute, the arm $i$ on the hinging-shaft of said valve, the bell-crank $k$, and the link $j$, coupling the arm $i$ with the upper arm of said bell-crank, the lower arm $k'$ of said crank being arranged in the path of the wheels of the conveyer elements, substantially as set forth.

In witness whereof I have hereunto signed my name in the presence of two subscribing witnesses.

GEORGE W. McCASLIN.

Witnesses:
HENRY CONNETT,
J. D. CAPLINGER.